United States Patent
Murai et al.

(10) Patent No.: US 12,466,394 B2
(45) Date of Patent: Nov. 11, 2025

(54) PARKING SUPPORT APPARATUS AND PARKING SUPPORT METHOD

(71) Applicant: Panasonic Intellectual Property Management Co., Ltd., Osaka (JP)

(72) Inventors: Akihito Murai, Kanagawa (JP); Hirofumi Nishimura, Kanagawa (JP); Yoshimasa Okabe, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 136 days.

(21) Appl. No.: 18/385,585

(22) Filed: Oct. 31, 2023

(65) Prior Publication Data
US 2024/0140402 A1 May 2, 2024

(30) Foreign Application Priority Data
Nov. 1, 2022 (JP) ................. 2022-175347

(51) Int. Cl.
*B60W 30/06* (2006.01)
*B60W 50/02* (2012.01)

(52) U.S. Cl.
CPC ........ *B60W 30/06* (2013.01); *B60W 50/0205* (2013.01); *B60W 50/0225* (2013.01); *B60W 2510/20* (2013.01)

(58) Field of Classification Search
CPC ............. B60W 30/06; B60W 50/0205; B60W 50/0225; B60W 2510/20; B62D 15/0285
See application file for complete search history.

(56) References Cited

U.S. PATENT DOCUMENTS

| | | | |
|---|---|---|---|
| 12,269,462 B1* | 4/2025 | Garimella | G06N 3/08 |
| 2014/0163862 A1* | 6/2014 | Choi | B60W 30/06 |
| | | | 701/400 |
| 2017/0015312 A1* | 1/2017 | Latotzki | B62D 15/027 |
| 2018/0111609 A1* | 4/2018 | Woo | B60W 30/06 |
| 2018/0246515 A1* | 8/2018 | Iwama | G05D 1/0251 |
| 2019/0027042 A1* | 1/2019 | Fujishima | B60W 30/06 |
| 2020/0284589 A1* | 9/2020 | Wartusch | G01C 21/3807 |
| 2021/0245736 A1* | 8/2021 | Wang | G07C 5/008 |
| 2021/0284131 A1* | 9/2021 | Max | G05D 1/0214 |
| 2022/0063599 A1* | 3/2022 | Prinzhausen | B60W 40/02 |
| 2022/0080970 A1* | 3/2022 | Günzel | B60W 30/18036 |
| 2022/0082405 A1* | 3/2022 | Sumner | G01C 21/3682 |
| 2024/0075921 A1* | 3/2024 | Paula | B60W 30/06 |
| 2024/0409128 A1* | 12/2024 | El Dana | G01C 21/206 |
| 2025/0006055 A1* | 1/2025 | Hu | B60W 30/06 |

FOREIGN PATENT DOCUMENTS

JP 2019-147480 9/2019

* cited by examiner

*Primary Examiner* — Sze-Hon Kong
(74) *Attorney, Agent, or Firm* — Greenblum & Bernstein, P.L.C.

(57) ABSTRACT

A parking support apparatus includes a storage that stores a manual parking path, and a processor that sets a safety region where the vehicle can pass. The processor causes the vehicle to perform automatic driving based on the generated automatic parking path, and the processor generates a parking path configured for driving within a range of the performance of the electric power steering and for the vehicle to pass inside the safety region.

7 Claims, 13 Drawing Sheets

PARKING SUPPORT APPARATUS AND PARKING SUPPORT METHOD

TECHNICAL FIELD

The present disclosure relates to a parking support apparatus and a parking support method.

BACKGROUND ART

Learning-type automatic parking is a type in which automatic parking is achieved by storing the parking path of manual parking, and reproducing the stored parking drive (see, for example, PTL 1). The driving while storing the parking path is called teacher driving or learning driving, but it is referred to as "manual parking" here.

The learning-type automatic parking can advantageously achieve the automatic parking even at a location with a height difference without the need of displaying a parking slot or a marker on the road surface, and is therefore suitable for parking in a fixed location, such as a home garage.

In addition, the learning-type automatic parking does not perform detection of the hindrance or recalculation of the parking path for bypassing the hindrance assuming that there is no hindrance in the range where the vehicle body has passed during the manual parking, and thus can be advantageously executed by low-cost ECUs with a low processing capacity.

CITATION LIST

Patent Literature

PTL 1
    JP 2019-147480 A

SUMMARY OF INVENTION

Technical Problem

Solution to Problem

A parking support apparatus according to present disclosure includes: a storage configured to store as a manual parking path a path of manual parking in which a driver manually performs parking of a vehicle; and a processor configured to set a safety region where the vehicle is allowed to pass based on the manual parking path stored in the storage. The processor generates an automatic parking path based on the safety region set and a performance of an electric power steering. The processor causes the vehicle to perform automatic driving based on the automatic parking path. The processor generates a parking path configured for driving within a range of the performance of the electric power steering and for the vehicle to pass inside the safety region.

A parking support method according to the present disclosure includes: storing as a manual parking path a path of manual parking in which a driver manually performs parking of a vehicle; setting a safety region where the vehicle is allowed to pass based on the manual parking path stored; generating an automatic parking path based on the safety region set and a performance of an electric power steering; causing the vehicle to perform automatic driving based on the automatic parking path; and in the generating the automatic parking path, generating a parking path configured for driving within a range of the performance of the electric power steering and for the vehicle to pass inside the safety region.

Advantageous Effects of Invention

According to the present disclosure, learning type automatic parking can be achieved even with an electric power steering with a weak torque.

DESCRIPTION OF EMBODIMENTS

Embodiments

Figure 1:
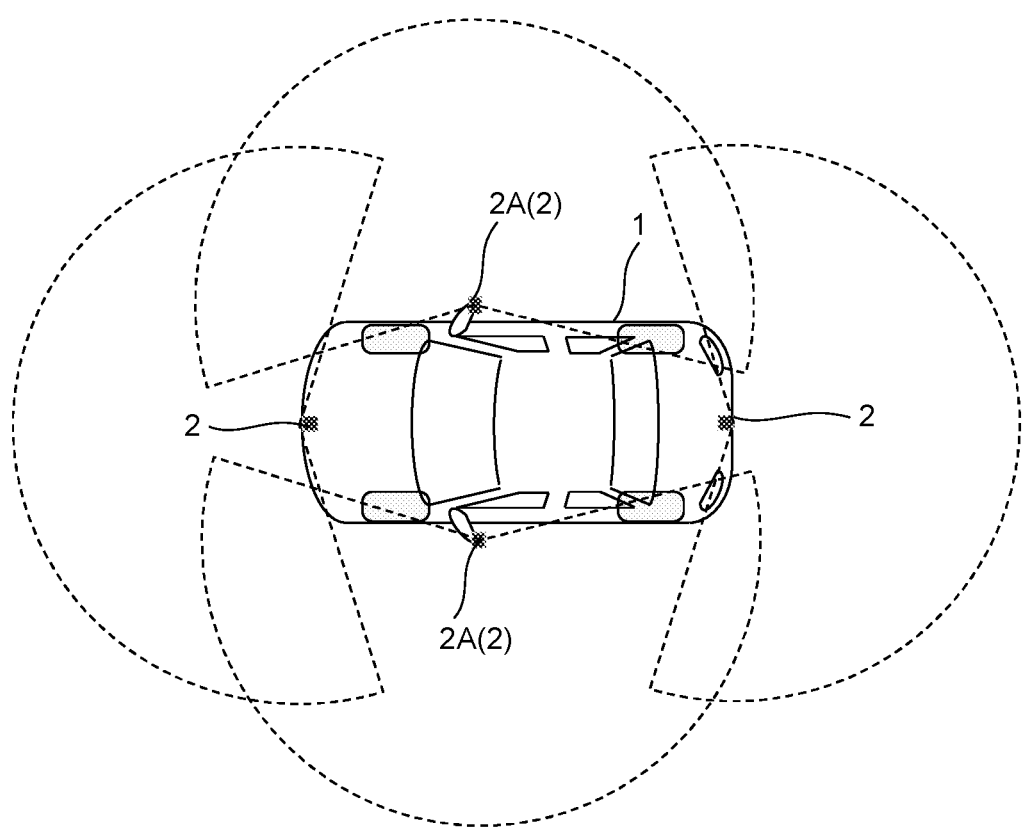
FIG. 1 is a diagram illustrating a vehicle to which a parking support apparatus according to an embodiment of the present disclosure is applicable.
Figure 2:
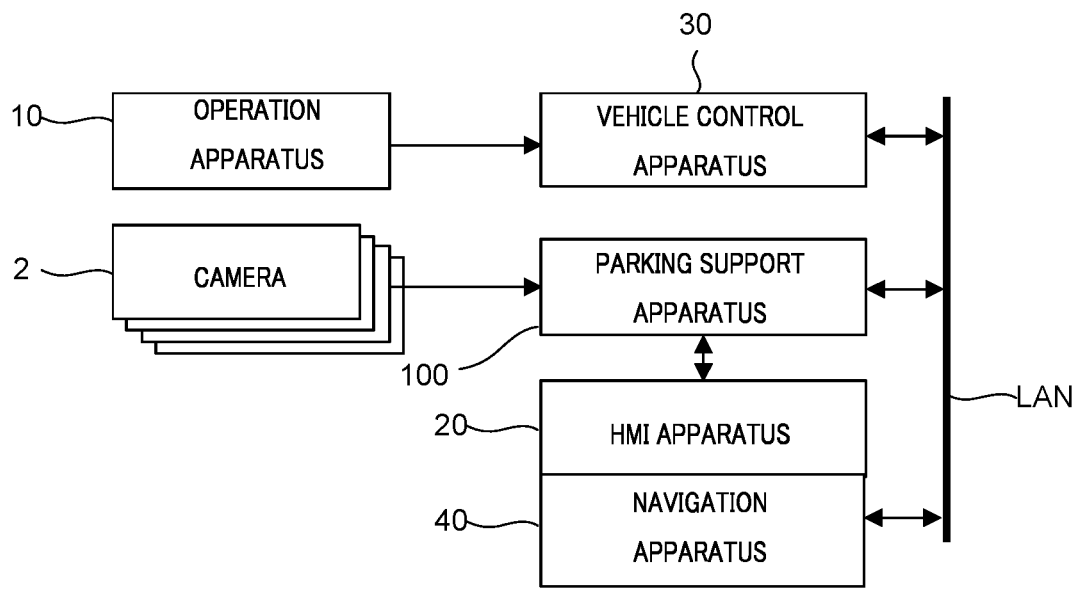
FIG. 2 is a diagram illustrating a configuration of a system on a network to which parking support apparatus is applied.

Embodiments of the present disclosure are described below with reference to drawings. FIG. 1 is a diagram illustrating a vehicle to which parking support apparatus 100 according to an embodiment of the present disclosure is applicable. FIG. 2 is a diagram illustrating a configuration of a system on a network to which the parking support apparatus is applied.

As illustrated in FIG. 1, vehicle 1 includes a camera that monitors the surroundings of the vehicle, and parking support apparatus 100 illustrated in FIG. 2, and thus can perform automatic parking. Automatic parking is executed by driving on a stored automatic parking path, and when starting the automatic parking, substantially the same position and orientation of the vehicle body as those at the start of manual parking are set. In practice, the position and orientation of vehicle 1 at the start of automatic parking may be shifted from those at the start of manual parking, but even when the start position of automatic parking is shifted from the start position of manual parking, the shift is automatically corrected to be set along the automatic parking path as long as the shift is small. As such it suffices that the shift is within the correctable range. For example, the positional relationship between vehicle 1 and the ground object around the vehicle captured with camera 2 at the start of manual parking is stored, and the shift from the start of manual parking is specified from the positional relationship between vehicle 1 and the ground object around the vehicle captured with camera 2 at the start of automatic parking. Since the steering angle control of automatic parking controls the steering angle in the direction of joining the automatic parking path from the current vehicle position, the shift is accommodated as vehicle 1 drives such that vehicle 1 finally drives along the parking path. Note that the automatic parking path is a parking path set based on the manual parking path, and may be referred to as automatic parking path, or simply, parking path.

As illustrated in FIG. 1, camera 2 is provided at four portions, i.e., front, rear, left and right portions, of the vehicle body of vehicle 1. Each camera 2 includes a fish eye lens, and has a field of view range of 180 degrees or greater in the horizontal direction (see broken line). Since each camera 2 is provided with a depression angle to capture the road surface, the road surface in a range of about 240 degrees is captured in one camera 2 when the range where the road surface is captured is converted into the field of view in the horizontal direction. For example, in the captured image of side camera 2A provided on the left and right sides of the vehicle body, the front and rear wheels and the side surface of the vehicle body are captured.

Side camera 2A is equipped in the housing of the side mirror, and when the side mirror is folded, camera 2 comes closer to the vehicle body side. The rotation axis of the side mirror is vertical, and even when the side mirror is folded, side camera 2A can capture images. When the mirror is folded, side camera 2A horizontally turns 30 degrees, but the front and rear wheels are captured by side camera 2A even when the mirror is folded as long as the side surface of vehicle 1 is flat because the mirror is attached to face downward.

In addition, as illustrated in FIG. 2, vehicle 1 includes operation apparatus 10, HMI (human machine interface) apparatus 20, vehicle control apparatus 30, and parking support apparatus 100 in addition to four cameras 2. Operation apparatus 10, such as a steering wheel and a pedal, is configured to be operated manually (with hands or feet) by the driver (occupant). HMI apparatus 20, such as a touch panel of navigation apparatus 40 provided in vehicle 1, is used as an HMI for the occupant to input an operation to parking support apparatus 100, for example.

Vehicle control apparatus 30 includes a CPU (Central Processing Unit), a ROM (Read Only Memory), a RAM (Random Access Memory) and an input/output circuit not illustrated in the drawing. When the occupant operates operation apparatus 10, vehicle control apparatus 30 receives the operation. In a typical operation mode, vehicle control apparatus 30 drives the motor (not illustrated in the drawing) in accordance with the operation so as to control the steering angle and vehicle speed, and outputs the operation information and the vehicle information such as the steering angle and vehicle speed to the LAN (Local Area Network, such as an in-vehicle LAN). When the parking support mode is set, vehicle control apparatus 30 receives a command of the speed and steering angle from parking support apparatus 100 via the LAN, and controls the speed and steering angle in accordance with the command.

Parking support apparatus 100 includes the CPU, ROM, RAM and input/output circuit not illustrated in the drawing, and acquires the operation information of operation apparatus 10 via the LAN. The occupant can operate parking support apparatus 100 through HMI apparatus 20. Parking support apparatus 100 may receive the location information of vehicle 1 output by navigation apparatus 40 via the LAN, or may directly acquire it from navigation apparatus 40. Camera 2 outputs the captured image to parking support apparatus 100 at all times, and parking support apparatus 100 generates the display image indicating the surroundings of the vehicle from the captured image and outputs it even when the parking support is not performed.

Figure 3:
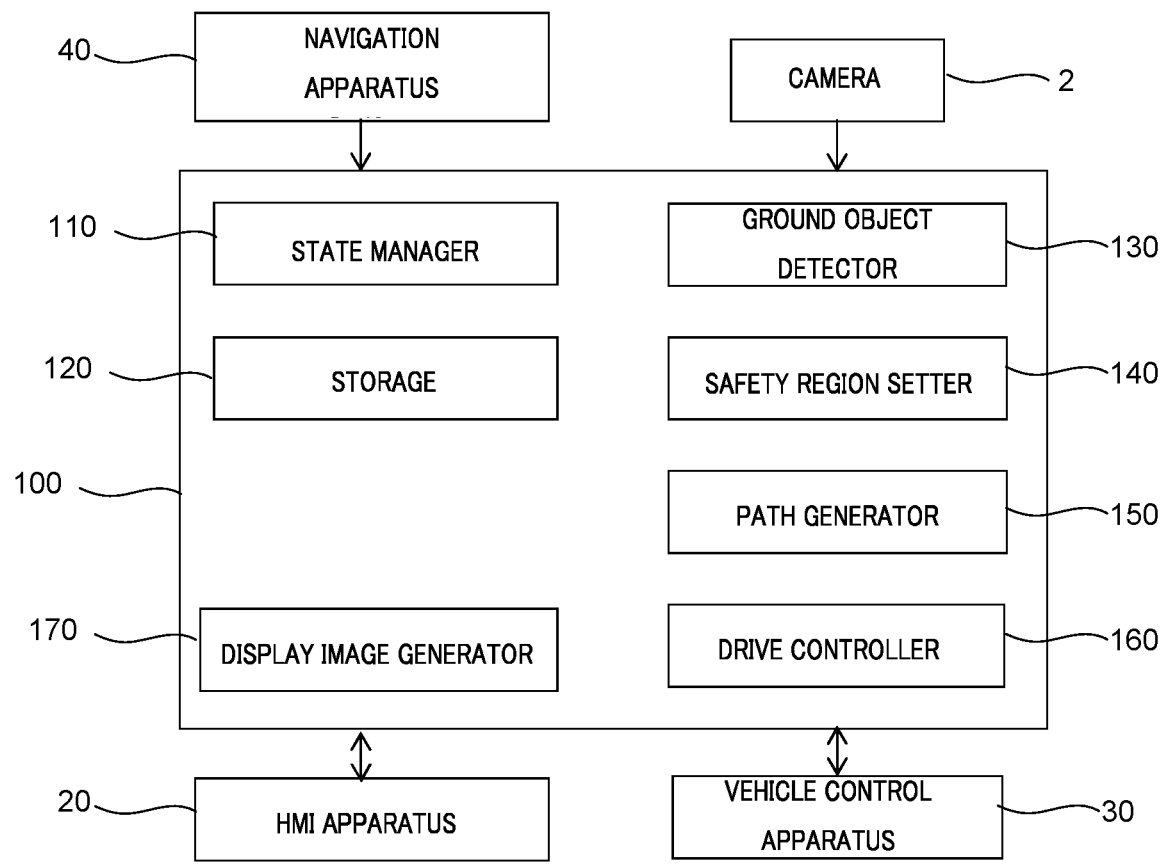
FIG. 3 is a block diagram illustrating the parking support apparatus.

As illustrated in FIG. 3, parking support apparatus 100 includes state manager 110, storage 120, ground object detector 130, safety region setter 140, path generator 150, drive controller 160, and display image generator 170.

State manager 110 manages the internal state of the parking support function. The internal state is divided into non-active state and active state. The active state is divided into manual parking state, exiting drive state, automatic parking state, standby state and the like. The parking support function of parking support apparatus 100 is set to the active state when the occupant activates parking support apparatus 100. Storage 120 stores the latitude and longitude of the location where learning driving (manual parking) is performed, as a learning point.

Ground object detector 130 detects a plurality of images of ground objects (immovable objects such as utility poles on the ground) from the captured image during the manual parking state, and specifies the position of the own vehicle with respect to a plurality of ground objects. Storage 120 stores images of the detected ground object and information about the position of the ground object. In addition, storage 120 stores drive information of the gear, speed, and steering angle during the manual parking state.

Safety region setter 140 calculates the trajectory of the four corners of the vehicle body on the basis of the drive information, and sets, as the safety region, the range in which the vehicle body has passed during the manual parking. The setting of the safety region of safety region setter 140 is elaborated later.

Path generator 150 calculates the parking path (automatic parking path) passing through the safety region. Drive controller 160 operates during the automatic parking state, and controls vehicle control apparatus 30 such that vehicle 1 drives along the parking path. Display image generator 170 generates a display image from the camera image.

The parking support function of parking support apparatus 100 is set to the active state when the occupant activates parking support apparatus 100, but may be automatically set to the active state. For example, in the case where storage 120 stores the learning point, the parking support function is automatically activated when vehicle 1 comes closer to the learning point. Ground object detector 130 detects an image corresponding to the ground object stored in storage 120 from the image, and specifies the difference between the position of the own vehicle at the start of the manual parking and the current position of the own vehicle. The above-mentioned process may be referred to as own vehicle position estimation process.

The learning-type automatic parking parks at the same position as in the manual parking by causing vehicle 1 to drive in the same manner as in the manual parking, and as such if the position and orientation of the vehicle body at the start of automatic parking are sifted from the position and orientation of the vehicle body at the start of manual parking, displacement of the parking path and parking position may occur.

In view of this, for example, it is possible to perform a preliminary operation support in which a vehicle surrounding image indicating the start position of the manual parking is displayed to guide the driver such that the vehicle position and vehicle orientation are the same as those of the learning state. Alternatively, as described above, the identification of the position of the own vehicle (the estimation of the own vehicle position) may be continuously performed also after the start of the automatic parking as well as at the start of automatic parking, so as to calculate the shift between the actual position and the position on the manual parking path stored in storage 120 and correct the drive path while driving such that the path of the own vehicle matches the stored manual parking path. Note that these processes may be performed by publicly known technique.

In addition, during the automatic parking state, drive controller 160 outputs the target steering angle to vehicle control apparatus 30, and vehicle control apparatus 30 instructs the electric power steering (EPS) system on the target steering angle and outputs the measurement value of the steering angle (actual measurement steering angle) to vehicle control apparatus 30.

Note that a buffer spring for generating a resilience from a position before the steering terminal end is incorporated in the steering apparatus for the purpose of reducing the impact received by the driver's hand because the driver's hand receives an impact when the steering wheel is suddenly stopped after the steering wheel is forcefully turned to the steering terminal end (the position where it cannot be turned any further). Therefore, at the steering terminal end where the buffer spring acts, the smaller the torque of turning the steering wheel, the smaller the steering angle. That is, the maximum steering angle is determined by the balance between the resilience of the buffer spring and the turning torque. During the automatic parking, the driver does not operate the steering wheel and the EPS independently turns the steering wheel, and therefore the torque is weaker than during the manual operation of turning the wheel by EPS and manual steering. As such, in the case where the driver has turned the steering wheel to the steering terminal end during the manual parking, the EPS cannot turn the steering wheel to the target steering angle instructed during the automatic driving. That is, the maximum steering angle of the automatic driving is smaller than the maximum steering angle of the manual parking.

When the instructed target steering angle given to vehicle control apparatus 30 is compared with the actual measurement steering angle, and the actual measurement steering angle is smaller than the target steering angle, drive controller 160 may perform correction of increasing the target steering angle, or provide an instruction for increasing the torque of the EPS. However, in the case where the angle has reached the maximum steering angle of the automatic driving, the maximum steering angle is set by the torque of the EPS, and therefore the steering angle does not increase even when the target steering angle is increased. Even if the torque is increased, the angle does not reach the maximum steering angle of the manual parking because the upper limit of the torque of the EPS is smaller than the maximum torque of the manual parking (manual operation+EPS).

During the manual parking in a narrow parking lot, in some cases the hindrance may be avoided at a position immediately before it by turning the steering wheel to the maximum steering angle. During the automatic parking based on the manual parking, the driving at a steering angle smaller than the maximum steering angle of the manual parking entails a large rotation radius, and as a result the vehicle body passes through the outside than during the manual parking. Consequently, the vehicle body may collide with the hindrance that is avoided at a position immediately before it during the manual parking.

More specifically, even when an instruction for setting the same steering angle as during the manual parking is provided, the steering angle is smaller than during the manual parking because the torque of the EPS is smaller than the torque of manual operation+EPS. The small steering angle may entail a large rotation radius, and collision with the hindrance that is avoided by steering during the manual parking may occur when vehicle is driven outside the manual parking path.

Figure 4:
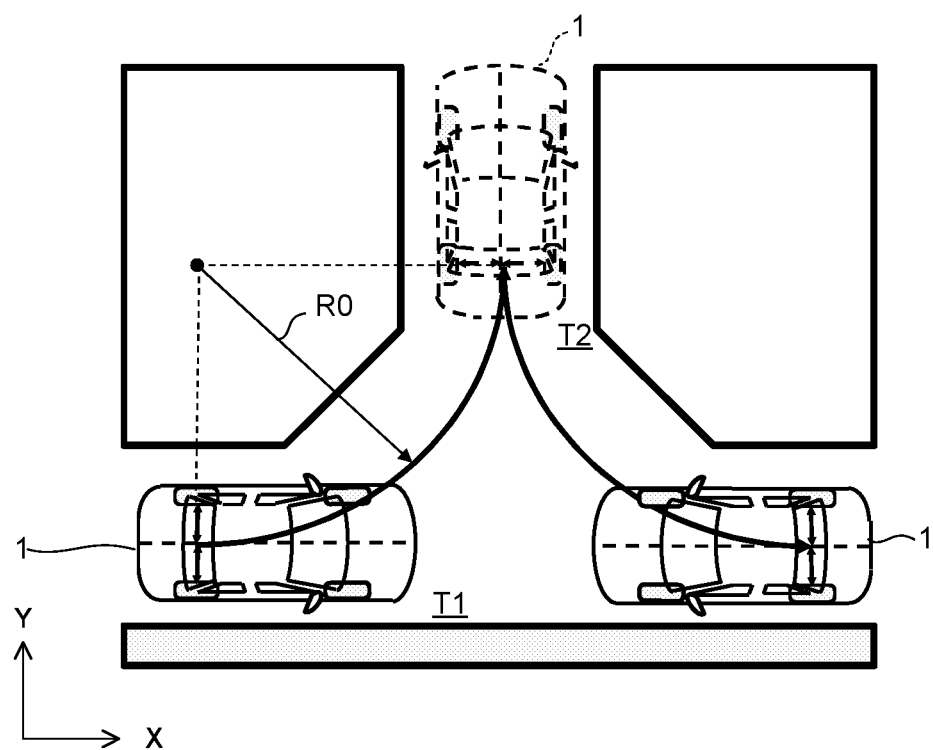
FIG. 4 is a diagram illustrating an example of a path of manual parking.

For example, as illustrated in FIG. 4, it is assumed that there is a T-junction composed of first path T1 extending in the X direction and second path T2 extending to the + side in the Y direction from the center of first path T1 in the X direction. Note that an orthogonal coordinate system (X, Y) is used in the illustration of FIG. 4 and the like. The common orthogonal coordinate system (X, Y) is used also in the drawings described later. For example, in FIGS. 5 to 7, the X direction is the front-rear direction with respect to the parking position, and the Y direction is the left-right direction with respect to the parking position as in FIG. 4.

In the T-junction illustrated in FIG. 4, it is assumed that the − side end of first path T1 in the X direction is the parking start position, and the + side end of first path T1 in the X direction is the parking position. For example, it suffices that manual parking has been performed on a parking path on which vehicle 1 is moved forward and turned from the parking start position to second path T2, and then vehicle 1 is moved backward and turned to the parking position at the + side end of first path T1 in X direction. It suffices that in this manual parking, vehicle 1 has turned at the maximum steering angle of the manual parking in the forward turning from the parking start position and the backward turning from a position in second path T2.

Figure 5:
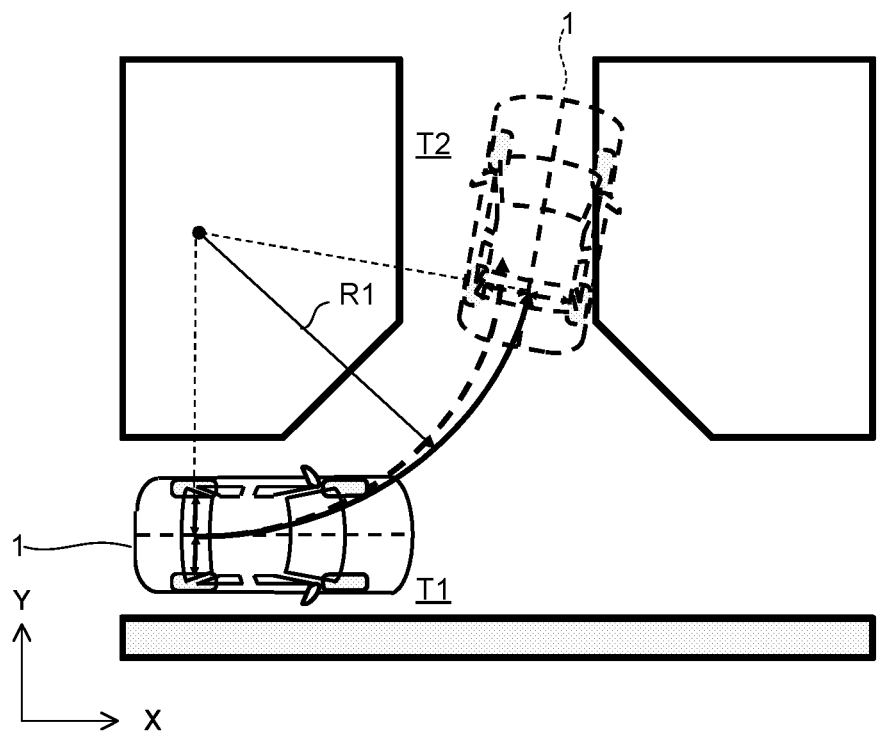
FIG. 5 is a diagram illustrating an example of deviation from a path of manual parking in automatic parking.

When the parking path of this manual parking is reproduced by automatic parking, the steering angle of the turning of vehicle 1 is smaller than the steering angle of the manual parking (maximum steering angle). Therefore, as illustrated in FIG. 5, rotation radius R1 of vehicle 1 of automatic parking becomes larger than rotation radius R0 of vehicle 1 of manual parking, and consequently the path of vehicle 1 deviates from the parking path of the manual parking when vehicle 1 turns. FIG. 5 illustrates an example in which in turning toward second path T2 from the parking start position, the path of vehicle 1 deviates from the parking path of the manual parking to the + side in the X direction. At this time, if there is a hindrance such as a wall extending along a T-junction at the deviation portion of vehicle 1, there is a risk of collision between vehicle 1 and the hindrance.

In view of this, safety region setter 140 sets a safety region where there is no risk of collision of the vehicle body with the hindrance on the basis of the manual parking path of the manual parking, and path generator 150 sets a parking path (automatic parking path) for vehicle 1 to pass inside the safety region on the basis of the performance of EPS. The parking path on the basis of the performance of EPS is a path of which the rotation radii of the arcs making up the path are each equal to or greater than a minimum rotation radius determined by the performance of EPS.

Figure 6:
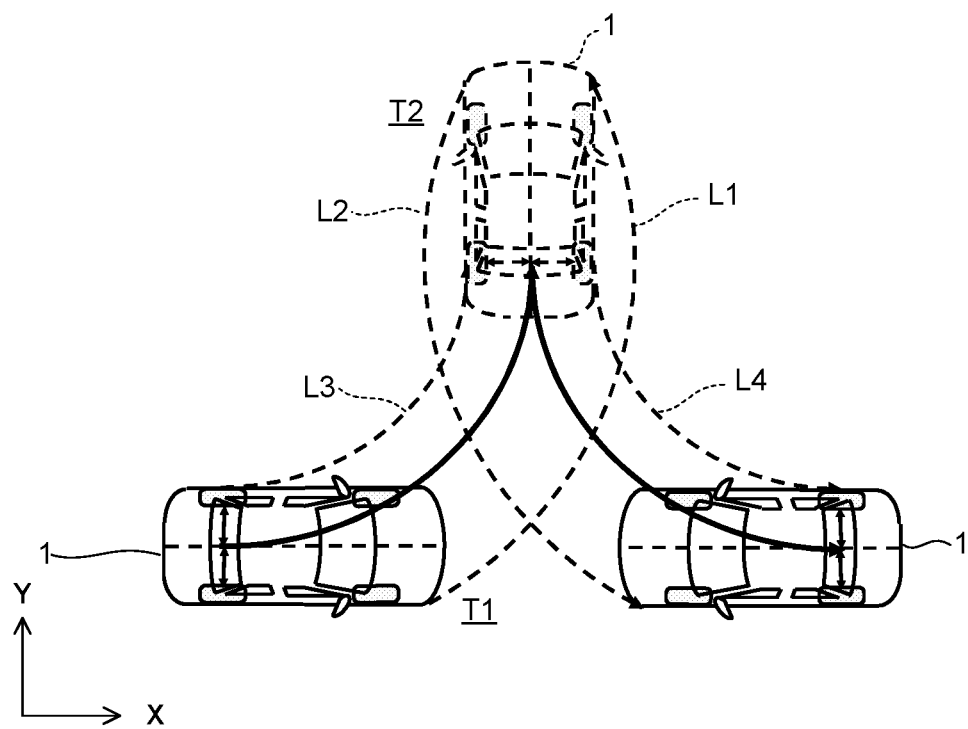
FIG. 6 is a diagram for describing an exemplary setting of a safety region.

Safety region setter 140 sets the region where the vehicle body has passed during the manual parking as the safety region. For example, as illustrated in FIG. 6, the region between movement trajectories L1 and L2 of the outermost corner portion of the vehicle body and movement trajectories L3 and L4 of the innermost portion of the vehicle body during the rotation may be set as the safety region. Alternatively, an operation of specifying the range overlapping the vehicle body each time the vehicle body moves during the manual parking, and adding the range overlapping the vehicle body to the safety region may be continued. In this case, the shape of the vehicle body may be taken into consideration, or the safety region may be set by approximating the shape of the vehicle body with a rectangular shape.

Trajectory L1 in FIG. 6 is the movement trajectory of the outermost corner portion of the vehicle body during the movement from the parking start position to second path T2. Trajectory L2 is the movement trajectory of the outermost corner portion of the vehicle body during the movement from second path T2 to the parking position. In addition, trajectory L3 is the movement trajectory of the innermost portion of the vehicle body during the movement from the parking start position to second path T2. Trajectory L4 is the movement trajectory of the innermost portion of the vehicle body during the movement from second path T2 to the parking position.

By setting the region surrounded by these trajectories L1, L2, L3 and L4 as the safety region and setting the automatic parking path in accordance with the safety region, automatic parking can be performed without deviation of the vehicle body from the safety region.

Safety region setter 140 may estimate the range where the vehicle body passes at the time of exiting on the basis of the manual parking path of the manual parking, and include the range estimated to be the range where the vehicle body passes at the time of exiting, to the safety region. For example, as illustrated in FIG. 7, in the case where vehicle 1 turns 180 degrees between the parking start position and the parking position, and it can be estimated that it exits from the parking position toward the parking start position at the time of exiting, safety region setter 140 may add region A between the parking start position and the parking position to the safety region.

Figure 7:
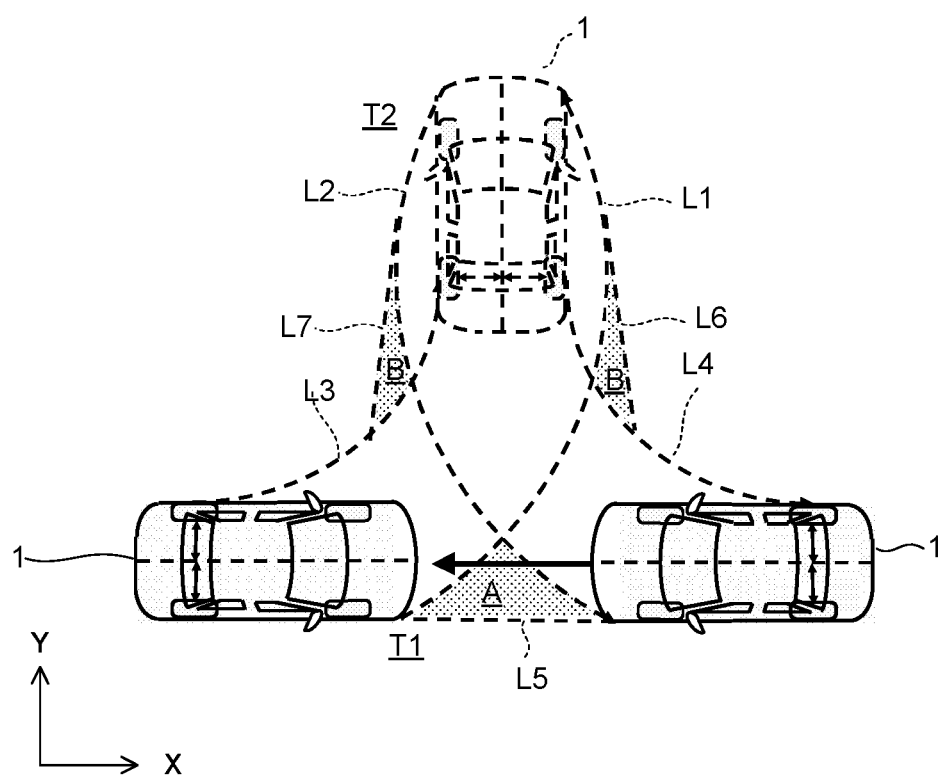
FIG. 7 is a diagram for describing an exemplary setting of a safety region.

For example, it is assumed that vehicle 1 can exit by moving straight to the − side in the X direction from the parking position of first path T1 in FIG. 7 (see the solid arrow). In this case, the region A between the safety region surrounded by trajectories L1, L2, L3 and L4 and trajectory L5 on which the side part of vehicle 1 on the − side in the Y direction passes when vehicle 1 moves straight to the − side in the X direction from the parking position may be added to the safety region.

Safety region setter 140 may add the range estimated to be a range where the vehicle body can pass to the safety region on the basis of the manual parking path during the manual parking. Safety region setter 140 may estimate that direction change using a T-junction or crossroads has been performed from the path of the manual parking, and support this estimation with map information of navigation apparatus 40, for example.

In the case where the portion where direction change is made in the parking path is a T-junction or crossroads, the position of region B corresponds to a corner of a property cut as a road for not interfering right and left turns, the portion of the safety region bent in a recess shape may be added to the safety region as with region B of FIG. 7.

The portion where the safety region is recessed is a recess formed by two trajectories crossing each other. In FIG. 7, it is the crossing portion of trajectory L2 and trajectory L3, and the crossing portion of trajectory L1 and trajectory L4. For example, among the trajectories, region B between trajectories L1 and L4 and line L6 extending to the − side in the Y direction from a given point (for example, the most protruded point) on trajectories L1 and L2 of the outermost corner portion of the vehicle body, and region B between trajectories L2 and L3 and line L7 may be added to the safety region.

In addition, the portion of region A in FIG. 7 may be added to the safety region not because it is the exiting path, but because of the recessed shape of the safety region and/or its relationship with the shape of the road.

Note that in the following description, the number of paths of the divided parking paths divided at the switching point of the forward movement and backward movement is referred to as number of strokes. In addition, the switching point of the forward movement and backward movement is referred to as turning point. In other words, the number of paths of the parking paths divided at the turning point may also be referred to as number of strokes. The number of turning points is referred to also as number of turnings. According to the above-mentioned definition, the number of turnings=the number of strokes−1 holds.

In addition, a common backward parking path for parking by moving forward and turning 45 degrees from the parking start position, moving backward and turning 45 degrees, and finally moving backward straight can be divided into two strokes, namely, the forward stroke and the backward stroke, and therefore may be referred to as 2-stroke parking. The above-described parking entailing direction change by moving forward and turning 90 degrees from the parking start position, and then moving backward and turning 90 degrees is also the 2-stroke parking.

In addition, when parking cannot be achieved by 2-stroke, parking is performed by increasing the number of turnings or the number of strokes. In this case, the number of strokes is four, namely the forward stroke, backward stroke, forward stroke, and backward stroke, and the number of turning points (the number of turnings) is three. In addition, in the illustration of the parking path, the middle point of the line connecting the grounded points of the two rear wheels is set as a representative point of the position of vehicle 1, and the moving path of the representative point is illustrated as the parking path.

In addition, the safety region in the 2-stroke parking of moving forward and turning 90 degrees from the parking start position, and moving backward and turning 90 degrees is exemplified above. The following describes an example of a safety region based on passage of the vehicle body during manual parking of 2-stroke backward parking of moving forward and turning 45 degrees from the parking start position, moving backward and turning 45 degrees, and finally moving backward straight.

Figure 8:
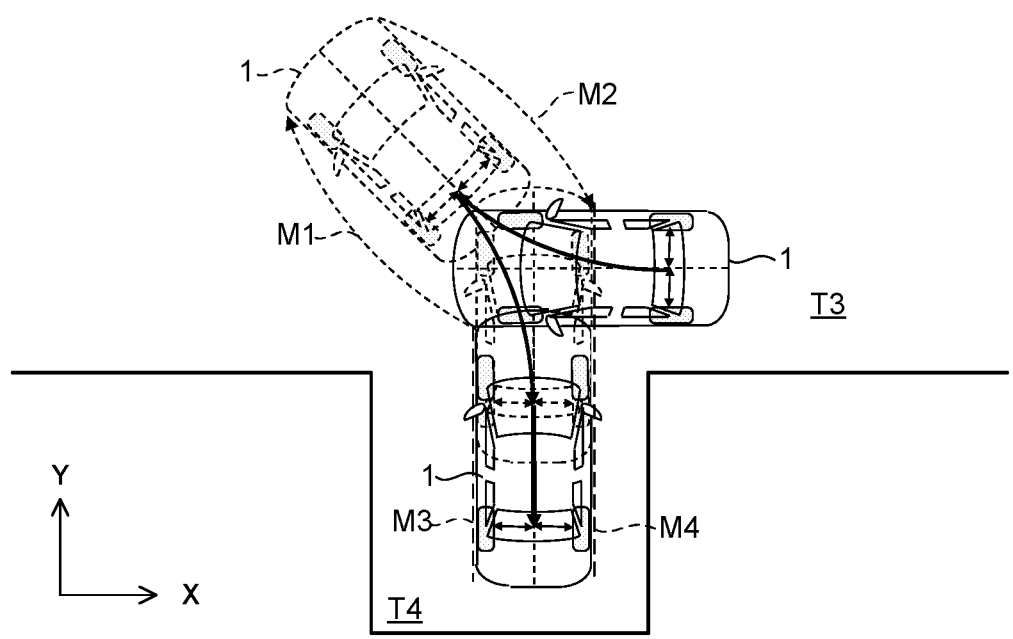
FIG. 8 is a diagram for describing an exemplary setting of a safety region in another example of a parking path.

FIG. 8 illustrates a road composed of third path T3 extending in the X direction, and fourth path T4 that is orthogonal to third path T3 and extends to the − side in the Y direction. For example, it is assumed that the parking start position is a portion on the + side in the X direction at the entrance of the fourth path, and the parking position is the − side end of fourth path T4 in the Y direction. Fourth path T4 as the parking position may be a parking space, or a pallet of a mechanical parking lot. In this case, it is assumed that a manual parking is performed on a parking path for parking by moving forward to the − side in the X direction and turning 45 degrees from the parking start position, then moving backward to the − side in the Y direction and turning 45 degrees from the turning point, and finally moving backward straight.

In this case, the safety region is the range surrounded by trajectories M1, M2, M3 and M4 in FIG. 8. Trajectory M1 is the trajectory of the outermost corner portion of the vehicle body moving forward to the − side in the X direction and turning 45 degrees from the parking start position. Trajectory M2 is the trajectory of the outermost corner portion of the vehicle body moving backward to the − side in the Y direction and turning 45 degrees from the turning point. Trajectories M3 and M4 are trajectories of both sides of the vehicle body moving backward straight.

Figure 9:
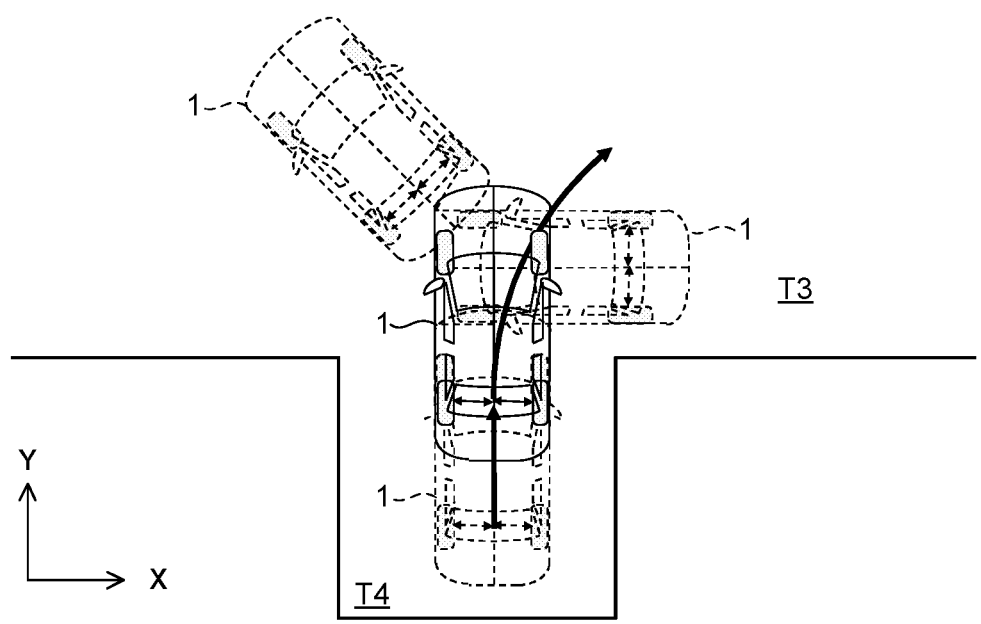
FIG. 9 is a diagram for describing an exemplary setting of a safety region in another example of a parking path illustrated in FIG. 8.

In addition, the region estimated to be the exiting path may be a region where the vehicle body passes when the vehicle moves forward straight to the + side in the Y direction from the parking position, and then moves forward to the + side in the X direction while turning in the entry direction of vehicle 1 for parking (the direction opposite to the driving direction at the start position of manual parking) as illustrated in FIG. 9, for example. This region is a region added to the safety region surrounded by trajectories M1, M2, M3 and M4 in FIG. 8. The exiting path may be estimated to be an exiting path of moving forward and turning at the same rotation radius as that of an arc of the backward stroke in the direction of the parking start position from a point stored beforehand as a point where the steering angle is reset to 0 in the middle of the backward stroke, for example. It should be noted that since the estimation of the exiting path involves uncertainty, the range where the vehicle body has passed during the actual exiting of vehicle 1 may be set as the safety region.

The safety region may not necessarily be set upon completion of the manual parking as long as it is set before execution of automatic parking. Before performing the automatic parking, vehicle 1 is always exited from the parking position and reset to the parking start position. Therefore, the range from the exit to the reset to the parking start position may be included in the manual parking range, and the range where the vehicle body has passed at the time of exiting may be added to the safety region.

For example, when vehicle 1 is activated by ignition on (IG-ON), the distance between the own vehicle position and the point where the manual parking has been performed is calculated, and the internal state of vehicle 1 is set to the manual parking state when the distance is short. This operation may be referred to as an operation in which the manual parking state for performing manual parking is not terminated at the time of parking upon completion of the manual parking, but is continued until it is reset to the parking start position after the exiting. A calculation state is set after passage through the parking start position and completion of the manual parking state, and a standby state is set after completion of the setting of the safety region and the path calculation. In this manner, the path calculation is completed before vehicle 1 is returned to the parking start position and the automatic parking is started. Note that in some cases vehicle 1 may not immediately return for the automatic parking after passing through the parking start position, and therefore when vehicle 1 is separated from the parking start position upon completion of the path calculation, the internal state of parking support apparatus 100 may be immediately transferred to the non-active state without interposing the standby state from the calculation state.

In accordance with the above-mentioned state transition, the manual parking state is set also while vehicle 1 is parked, but by not performing the own vehicle position estimation and additional registration of the safety region on the premise that vehicle 1 is parked, no problem occurs in terms of power consumption because only a polling process of waiting for a movement of vehicle 1 is continued. In addition, it suffices to store information indicating the manual parking state at the time of stop through ignition off (IG-OFF), read information indicating the manual parking state at the time of activation through ignition on (IG-ON), and perform a process of adding the range overlapping the vehicle body to the safety region when the exiting is started.

Figure 10:
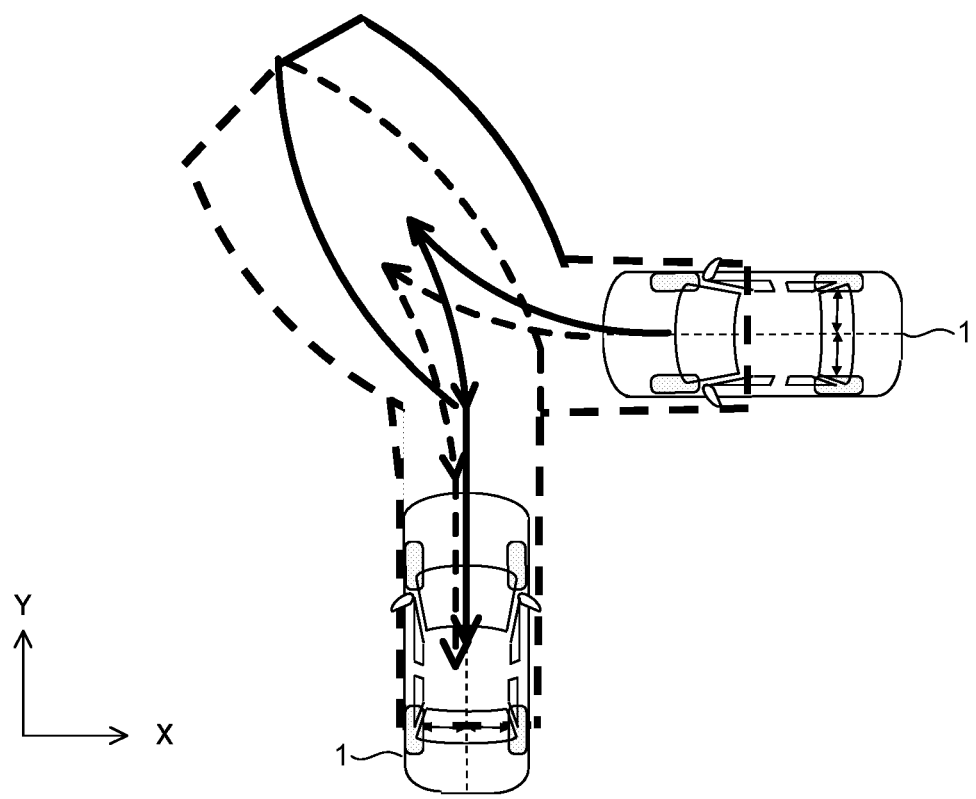
FIG. 10 is a diagram illustrating an example of a region where the paths of the manual parking of two times are combined.

In addition, safety region setter 140 may set the safety region on the basis of manual parking of multiple times. For example, as illustrated in FIG. 10, the paths of the manual parking of two times may be stored in storage 120 so as to calculate the ranges where the vehicle body has passed as the safety region of the first manual parking and the safety region of the second manual parking, and set a region obtained by combining the regions included in the safety regions as the safety region. In addition, safety region setter 140 may store the safety region of the first manual parking (the region of the broken line) in storage 120, and perform a process of adding the region overlapping the vehicle body (the region of the solid line) to the safety region with time when the second manual parking is performed. In addition, the multiple manual parking of two or more times may not necessarily continuously performed, and the manual parking may be restarted (continued) on another day. In addition, safety region setter 140 may further add the range where the vehicle has passed at the time of exiting to the safety region. For example, the occupant may select a cancel of learning permission for permitting learning (addition of the safety region) such that learning is performed for each manual parking when there is a learning permission. Alternatively, path generator 150 may attempt to set the parking path (automatic parking path) with the same number of strokes as in the manual parking such that the learning permission is maintained when it fails to set the parking path with the same number of strokes as in the manual parking, and that the learning permission is cancelled when it succeeds in setting the parking path with the same number of strokes as in the manual parking. For example, the system may inform the occupant that learning is no longer required and allow the occupant to select cancel of the learning permission, or it may cancel it automatically without informing the occupant.

Safety region setter 140 may add the safety region on the basis of the drive path of automatic parking. The parking path is set such that the vehicle body passes inside the safety region, but the actual drive path may deviate from the set parking path due to various factors (such as slip of vehicle 1, reduction in torque of the EPS, the front wheel caught by steps on the road, unintentional motions of front wheel). In view of this, during the automatic driving, safety region setter 140 may perform a process of adding the region overlapping the vehicle body to the safety region with time.

Figure 11A:
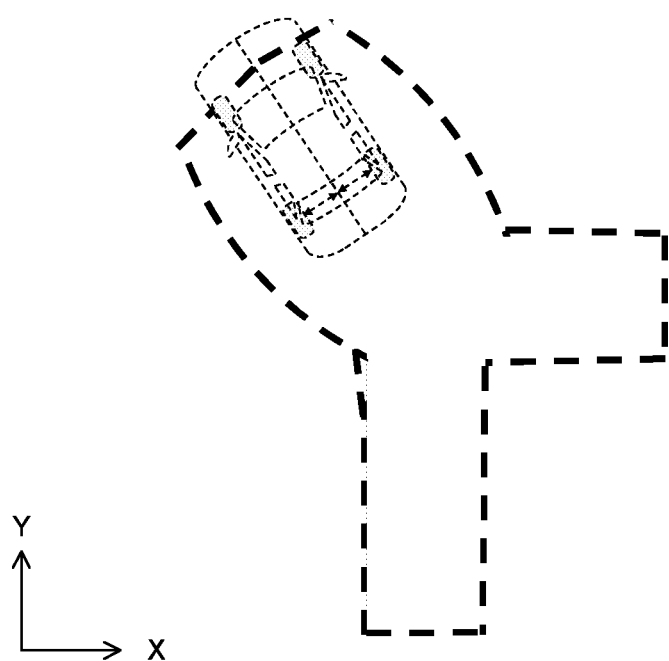
FIG. 11A is a diagram illustrating an example of deviation of a vehicle from a safety region during automatic parking.
Figure 11B:
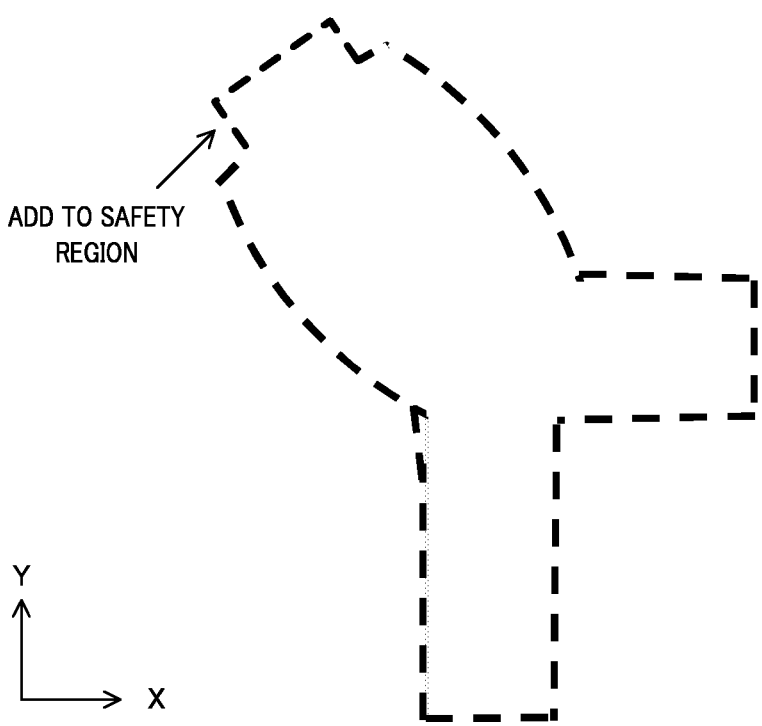
FIG. 11B is a diagram illustrating a safety region additionally provided with the deviation region of the vehicle in FIG. 11A.

For example, as illustrated in FIG. 11A, when vehicle 1 slips and the vehicle body goes outside the safety region, safety region setter 140 adds the region overlapping the vehicle body to the safety region as illustrated in FIG. 11B. In this manner, the safety region is expanded, and a more moderate parking path may be set in that region. Note that when the vehicle body goes outside the safety region during automatic parking, the update of the safety region may be cancelled. For example, when vehicle 1 slips and comes closer to a hindrance such as a wall, the parking path approaching the hindrance can be prevented from being set by cancelling the update of the safety region (safety region setter 140 does not write safety region data changed during automatic parking in storage 120, but retains the data before the automatic parking). The cancel may not be manually performed, and may be automatically performed when the automatic brake is operated or when the acceleration sensor has detected a collision.

In addition, in learning-type automatic parking, the automatic parking is performed within the range of the region where the vehicle body has passed during the manual parking, and thus the automatic parking can be performed in a safe manner without changing the path based on the hindrance detection and the like, while this feature does not exclude the use of information acquired by the hindrance detection. For example, safety region setter 140 may add a process of excluding, from the safety region, the range where a hindrance is detected during the manual parking. In this case, safety region setter 140 may change enable/disable of the excluding process depending on whether the region is the region where the vehicle body has passed, or the region estimated to be a region where the vehicle body will pass.

Note that the region where the vehicle body has passed includes the range where the vehicle body has passed during the manual parking and the range where the vehicle body has passed at the time of exiting of the vehicle, which are ranges with a record of passage of the vehicle. In addition, the region estimated to be a region where the vehicle body will pass includes the range estimated to be the range where the vehicle body passes at the time of exiting of vehicle 1 on the basis of the manual parking path and the range estimated to be a range where vehicle 1 can pass on the basis of the manual parking path, which are ranges with no record of passage of the vehicle.

Figure 12:
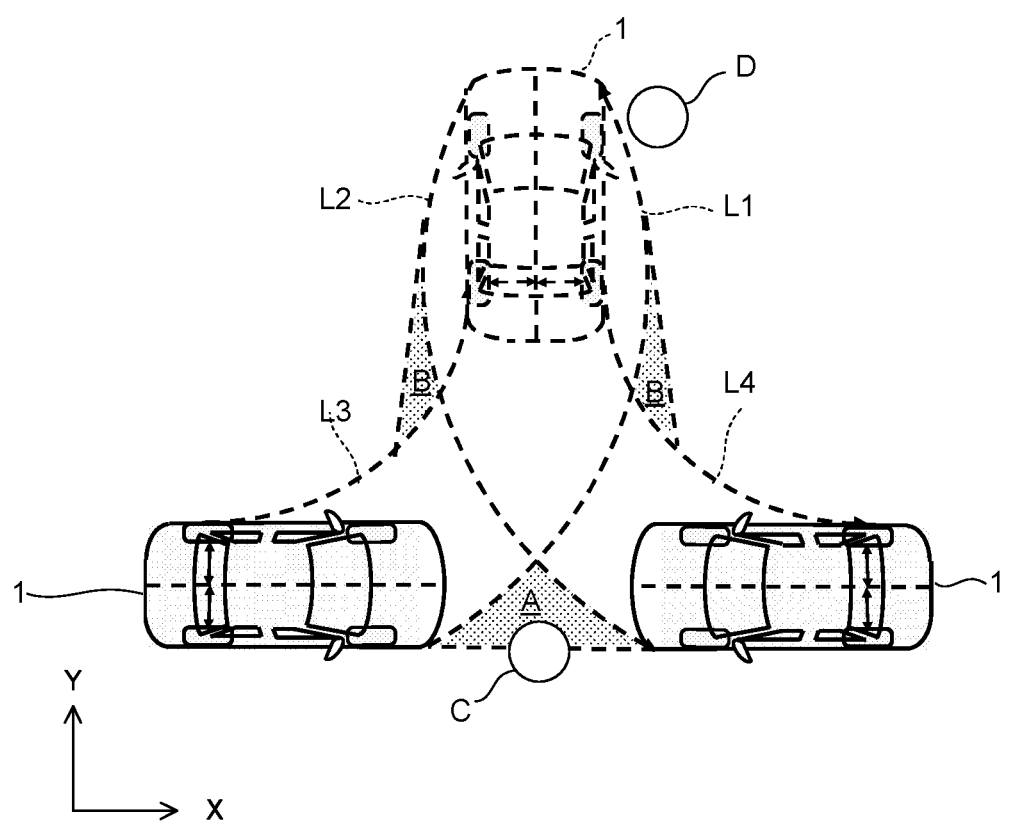
FIG. 12 is a diagram for describing an exclusion range of the safety region due to a hindrance.

For example, in the case where ground object detector 130 has detected hindrance C (for example, a telephone pole and the like) at a position overlapping region A in FIG. 12 as a ground object in the region around vehicle 1 during the manual parking, safety region setter 140 may exclude from the safety region the region around hindrance C in region A estimated to be a region where the vehicle body passes at the time of exiting and added to the safety region. The reason for this is that if there is hindrance C at a position around the parking path, the vehicle would not pass through a region around hindrance C at the time of exiting.

On the other hand, when there is hindrance D outside the range where the vehicle body has passed, safety region setter 140 does not exclude the region around hindrance D from the safety region. The safety region around hindrance D is a region where the vehicle body has passed, and therefore it is estimated such when there is hindrance D near the region where the vehicle body has passed, a hindrance D has avoided in the manual parking. In the case where automatic parking is performed inside the safety region, approach of vehicle 1 to the position of hindrance D can be determined to be accepted on the basis of the manual parking path, and therefore the region where the vehicle body has passed is not excluded from the safety region even when there is hindrance D near that region.

In addition, the range to be excluded from the safety region may be a range 20 cm or less from the hindrance, for example.

In addition, it is possible to use the publicly known technique disclosed in PTL 1 to allow the vehicle body to pass through a region near the safety region as a relatively safe region during automatic parking, for example. Unlimited extension of the safety region involves risk, but during manual driving, the vehicle body is operated so as not to come extremely closer to the hindrance, and therefore the region 20 cm or less from the safety region may be regard as a relatively safe region. In addition, in the vicinity of the turning point during manual parking, the vehicle body may come close to a position immediately before the hindrance for the purpose of turning, and therefore, in the region in the vicinity of the turning point, the width of the relatively safe region may be reduced (e.g., to a width of 10 cm) than in the other location (such as in the vicinity of manual parking start point). In addition, as described above, in the vicinity of the region where a hindrance has been detected, the setting of the relatively safe region may be prohibited, or the width may be reduced. If the passage of the vehicle body in the relatively safe region is accepted when setting the parking path, the number of strokes to be added can be reduced in some situation when addition of stroke is required.

Next, a path calculation process of setting a parking path by path generator 150 is described. First, path generator 150 specifies a turning start point where vehicle 1 changes from straight movement to turning, a turning end point where vehicle 1 changes from turning to straight movement, and a turning point of changing the driving direction.

Figure 13:
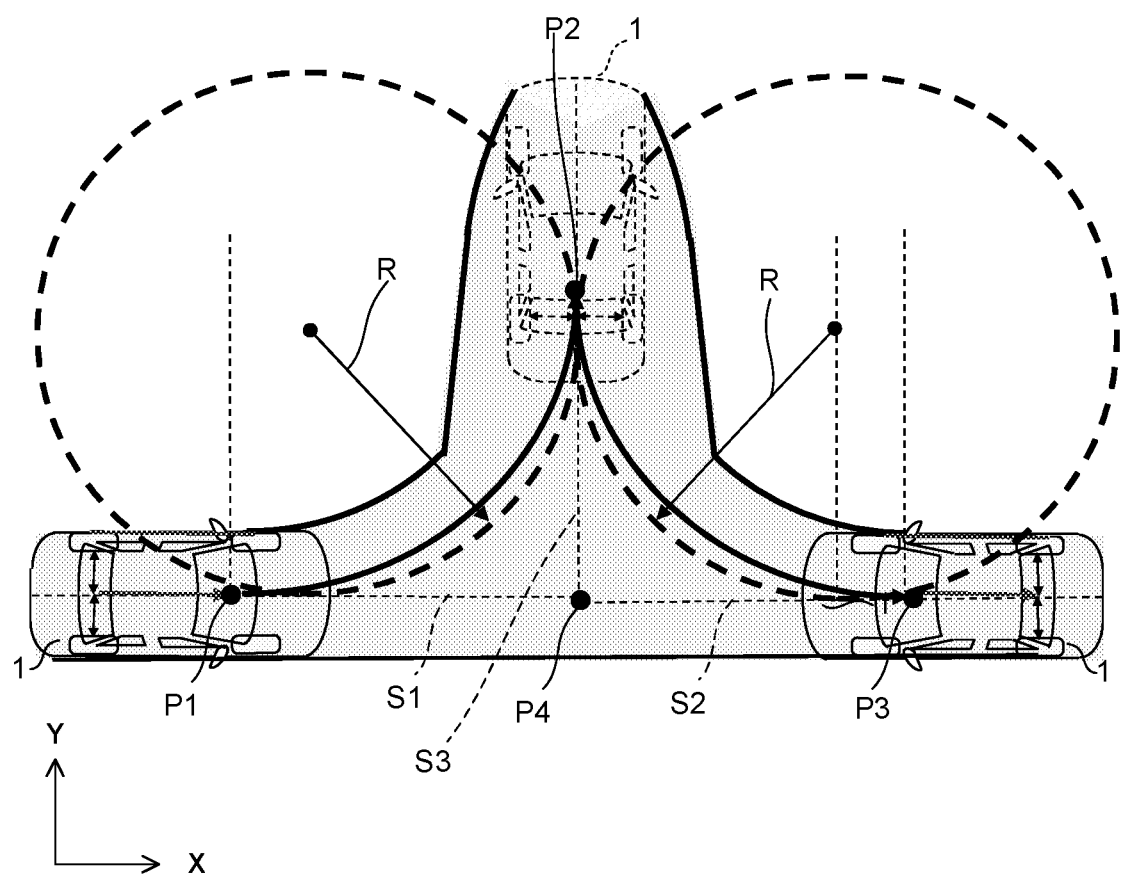
FIG. 13 is a diagram for describing an example of a path calculation process.

For example, at the T-junction in FIG. 13, when there is no straight movement before and after parking start position P1, turning point P2, and parking position P3, the turning start point is the same as parking start position P1, and turning point P2 is the same as the turning end point of the turning started from the parking start position. In addition, turning point P2 is the same as the turning start point toward the parking position from turning point P2, and parking position P3 is the same as the turning end point in the turning started from turning point P2.

In addition, path generator 150 sets front-rear axis S1 of the vehicle body at the turning start point before the turning (in the example illustrated in FIG. 13, the turning start point that is the same as parking start position P1) and front-rear axis S2 of the vehicle body at the turning end point after the turning (in the example illustrated in FIG. 13, the turning end point that is the same as parking position P3), so as to determine intersection P4 between front-rear axis S3 of the vehicle body at turning point P2 (in the example illustrated in FIG. 13, the same as the turning end point before the turning) and two front-rear axes S1 and S2. Intersection P4 is located farther than the turning path of vehicle 1 from the turning center point located outside the safety region, and therefore intersection P4 may be referred to as being located at a position remote from the non-safety region (the region outside the safety region) and located innermost in the safety region. Next, with the minimum possible rotation radius of EPS set as R, path generator 150 determines contact points of the circle of radius R with front-rear axes S1 and S3 and front-rear axes S3 and S2.

Figure 14:
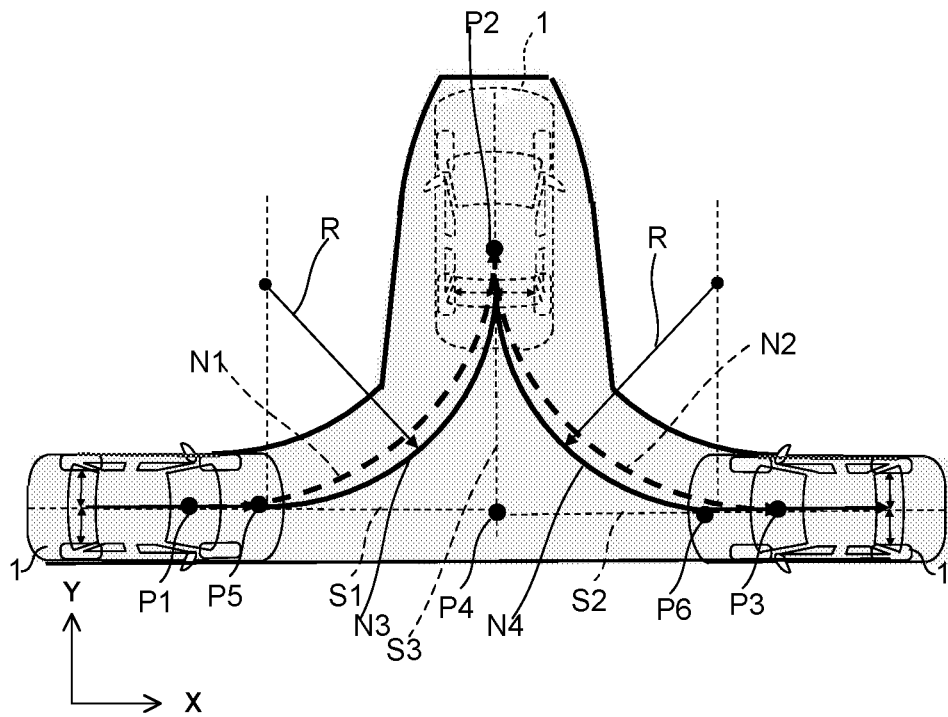
FIG. 14 is a diagram for describing an example of a path calculation process.

When minimum possible rotation radius R of EPS is smaller than the rotation radius during manual driving, the path where vehicle body passes inside the safety region can be set as illustrated in FIG. 14. When minimum rotation radius R of the automatic driving is smaller than the rotation radius of manual driving, contact points P5 and P6 of the circle of radius R with two front-rear axes S1 and S2 are closer than the turning start point (parking start position P1) and the turning end point (parking position P3) with respect to the above-mentioned intersection P4. In this case, the above-mentioned circle is located closer to the intersection P4 side than paths N1 and N2 of manual driving, and radius R of the circle is smaller than the rotation radius paths N1 and N2 of manual driving. That is, when the above-mentioned contact points P5 and P6 are set as the turning start point or the turning end point, vehicle 1 can drive on paths N3 and N4 along the arc of the circle, and thus it can drive on a path more remote from the non-safety region than during manual driving.

In view of this, path generator 150 may move the turning start point and the turning end point to the above-mentioned contact point, and set a parking path in which the section from parking start position P1 to the turning start point (contact point P5) and the section from the turning end point (contact point P6) to parking position P3 are straight lines. In this manner, the path of the turning section passes through paths N3 and N4 inside the safety region closer to intersection P4 than during manual driving, and vehicle 1 does not come out to the region where the vehicle body has not passed during manual driving.

Figure 15:
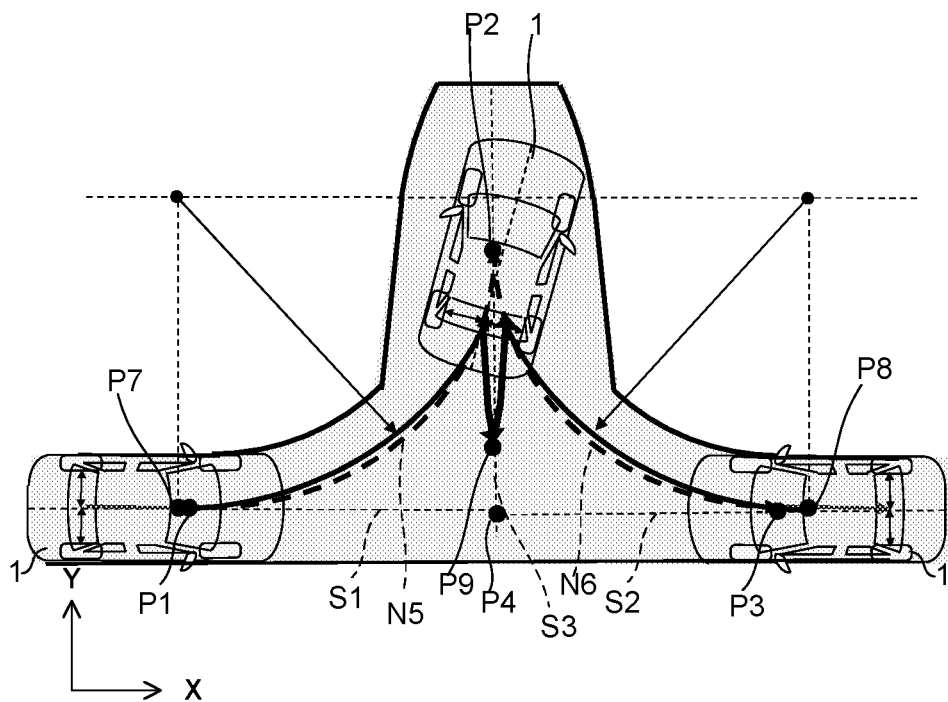
FIG. 15 is a diagram for describing an example of a path calculation process.

On the other hand, when minimum possible rotation radius R of EPS is greater than the rotation radius of manual driving, contact points P7 and P8 of the circle of radius R with two front-rear axes are farther than the turning start point (parking start position P1), the turning point, and the turning end point (parking position P2) with respect to intersection P4 as illustrated in FIG. 15. In this case, the above-mentioned circle is located on the side opposite to intersection P4 with respect to drive paths N5 and N6 of manual during. That is, when the above-mentioned contact points P7 and P8 are set as the turning start point or the turning end point, it is driven on a path closer to the non-safety region than during manual driving.

In this case, path generator 150 may move the turning start point and the turning end point to the above-mentioned contact points P7 and P8. When the turning start point is set at a position farther from intersection P4 than the turning start point of manual driving, the path of the automatic parking passes through a father side than the path of manual driving with respect to intersection P4, and therefore the vehicle body slightly deviate from the safety region set first. However, the deviation width of the vehicle body from the safety region is small, and therefore when the above-described relatively safe region is added to the safety region, the automatic parking path can be set inside the safety region including the relatively safe region, for example.

In addition, minimum rotation radius R of automatic parking is greater than the rotation radius of manual driving, and therefore the orientation of vehicle 1 is turned to only up to an angle smaller than 90 degrees even if it is turned to turning point P2 of manual driving. In practice, the front end of the vehicle body reaches the end of the safety region before turning point P2 of manual driving, and thus the turning angle of the vehicle body at the first stroke is further small. The same applies to the last stroke from turning point P2 toward the parking position.

Therefore, to turn the orientation of vehicle 1 180 degrees, it is necessary to increase the number of strokes. More specifically, as in FIG. 15, path generator 150 sets a path in which from the position where the front end of the vehicle body has reached the end of the safety region, vehicle 1 moves back along a small arc while changing the steering angle left and right so as to stop at position P9 at an orientation turned 90 degrees from the start of parking. Then, path generator 150 sets a 2-stroke path from position P9 to the parking position as a bilaterally symmetric path with respect to the path of vehicle 1 from the parking start position to position P9. The stroke of moving back to position P9 and the stroke of moving forward from position P9 are additional strokes, and may be referred to as turning stroke. The rotation radius of a small arc during the turning stroke may be set to the same rotation radius as that of the first and last strokes.

Figure 16:
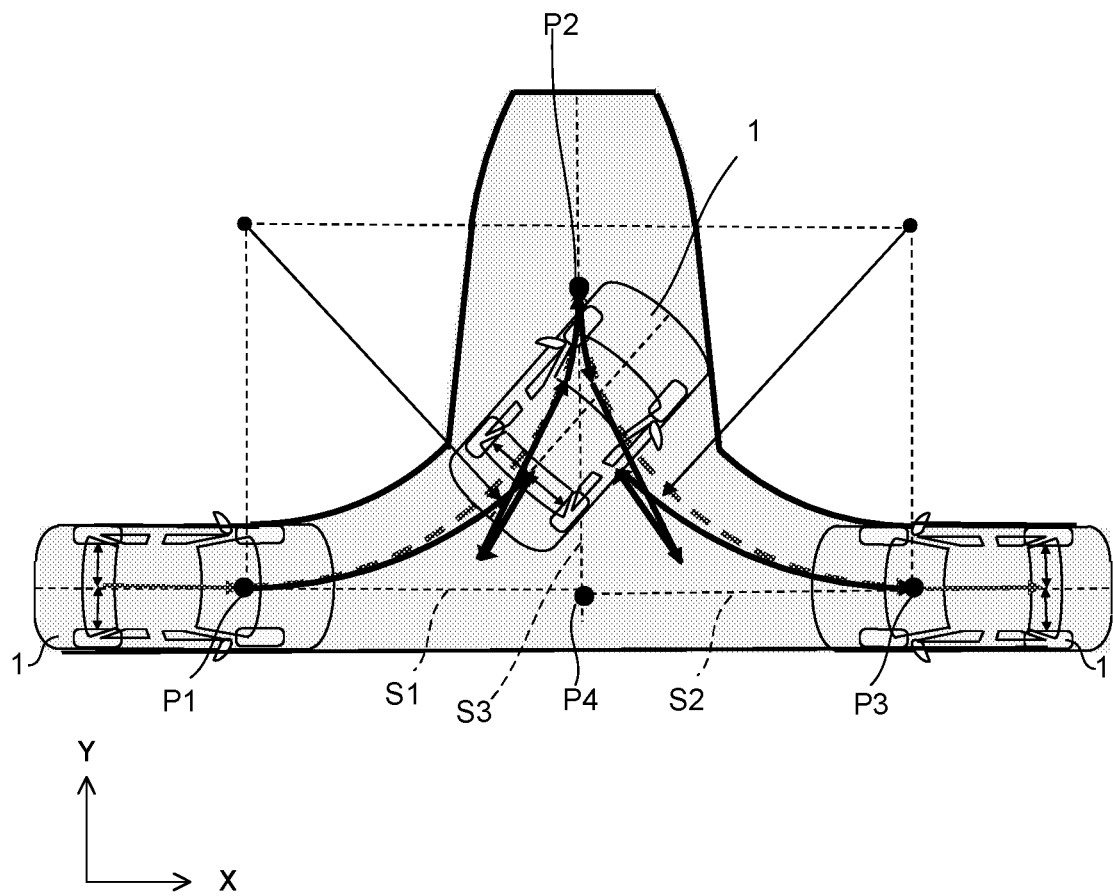
FIG. 16 is a diagram for describing an example of a path calculation process.

In addition, a parking path that passes only through the safety region set first based on the manual parking path may be set without adding the above-mentioned relatively safe path as the safety region. For example, as illustrated in FIG. 16, when the turning start point is the same as the turning start point of manual driving (parking start position P1), the first stroke in the path of automatic driving goes on the intersection P4 side, and thus the vehicle body advances inside the safety region. However, as a trade-off, the front end of the vehicle body enters the end of the safety region at a relatively early time point, i.e., at a time point when the vehicle body has turned only at a small angle, and as such vehicle 1 goes outside the safety region if it moves further forward.

In view of this, path generator 150 sets a path in which the vehicle turns at a position where the front end of the vehicle body enters the end of the safety region, then moves back in the opposite direction while steering and turning the vehicle body, and stops at a position where the rear end of the vehicle body enters the end of the safety region. Then, path generator 150 sets a path in which after moving forward while steering and turning the vehicle body, vehicle 1 moves straight in the direction of turning point P2 of manual driving, and steers before turning point P2 such that the vehicle 1 stops in an orientation turned 90 degrees from parking start position P1.

Thereafter, path generator 150 sets a path bilaterally symmetric with the path set as described above such that vehicle 1 can move toward the parking position. That is, parking including 180-degree turning is performed by dividing each of two strokes with 90-degree turning of manual driving into three strokes, and turning the vehicle body little by little.

In this manner, in the calculation of a path passing only the safety region set based on the manual parking path not including the relatively safe region, the motion range of the vehicle body may be smaller and the number of strokes may be greater than in the case where the relatively safe region is added to the safety region.

Figure 17:
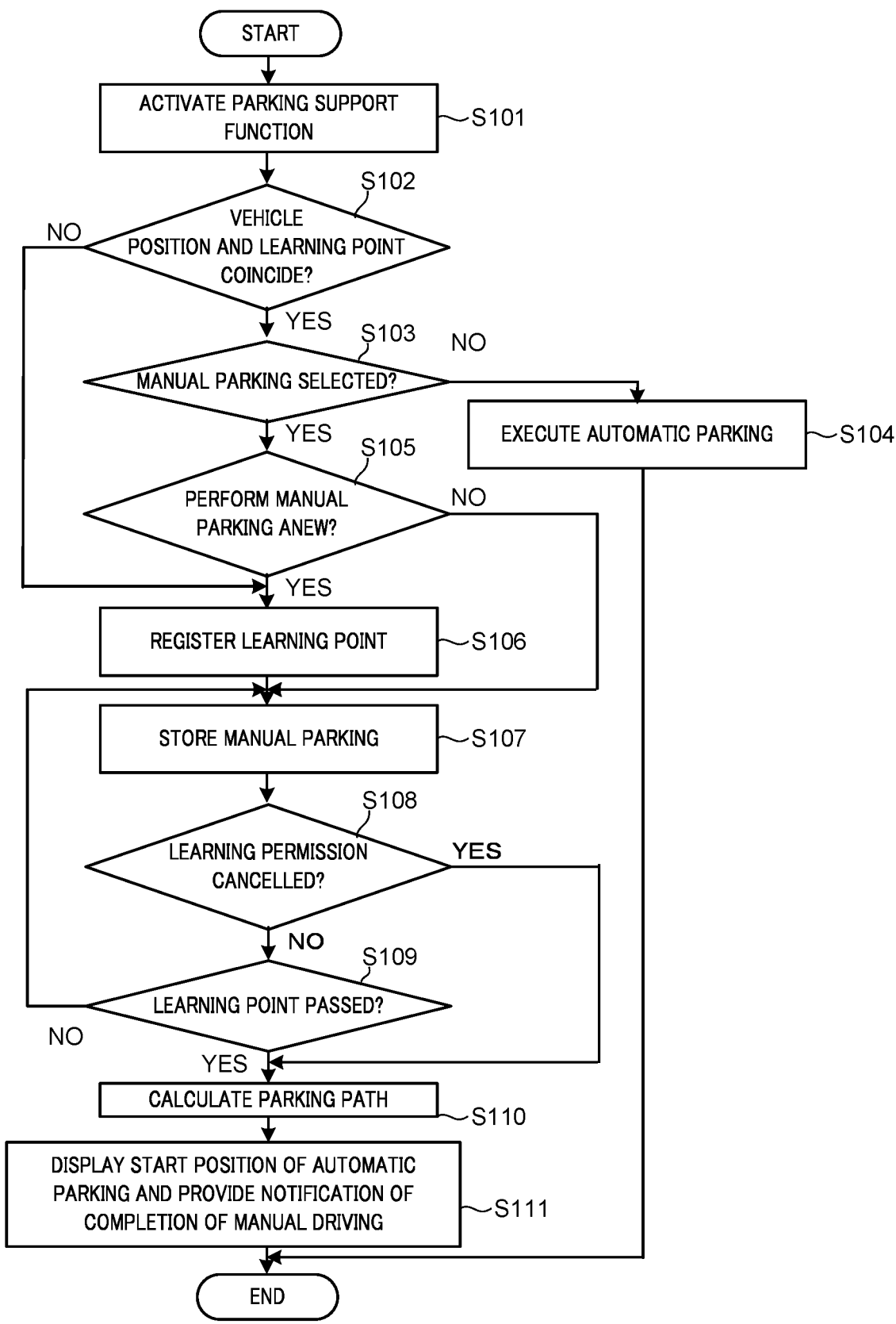
FIG. 17 is a flowchart illustrating an exemplary operation of a parking support control in the parking support apparatus.

Next, an exemplary operation of parking support apparatus 100 is described. FIG. 17 is a flowchart illustrating an exemplary operation of a parking support control of parking support apparatus 100.

As illustrated in FIG. 17, parking support apparatus 100 activates the parking support function (step S101). Note that the process of step S101 may be an operation of HMI apparatus 20 by the occupant. In addition, normally, parking support apparatus 100 displays a region around vehicle 1 on the display of HMI apparatus 20, and therefore the process of step S101 may be a process of switching the function of displaying a region around vehicle 1 to the parking support function. In addition, parking support apparatus 100 may activate the parking support function when vehicle 1 approaches the learning point. That is, without waiting for the operation of the occupant, parking support apparatus 100 may automatically activate the parking support function on the basis of the location information obtained from navigation apparatus 40. The activation of the parking support function may be referred to also as changing the internal state of the parking support function from the non-active state to the active state by state manager 110. Since the internal state of the parking support function is managed by state manager 110, the determination process in the flowchart may be regarded as being performed by state manager 110.

State manager 110 determines whether the position of vehicle 1 and the learning point are substantially the same (step S102). More specifically, state manager 110 acquires the location information of vehicle 1 from navigation apparatus 40, and determines whether the location information and the learning point of manual parking stored in storage 120 are substantially the same, for example. Note that even when the position of vehicle 1 and the learning point do not exactly match, state manager 110 may determine that the position of vehicle 1 and the learning point are substantially the same as long as the error can be recovered by the steering angle control of automatic parking. When the present position of vehicle 1 and the learning point of manual parking stored in storage 120 are substantially the same, automatic parking can be performed at the present position, and the learning of manual parking can be continued.

When it is determined that the position of vehicle 1 and the learning point do not coincide with each other (step S102, NO), the process is advanced to step S106. On the other hand, when the position of vehicle 1 and the learning point coincide with each other (step S102, YES), state manager 110 determines whether to select the manual parking (step S103). More specifically, display image generator 170 displays options for the occupant to select the manual parking or the automatic parking and outputs a question message, and state manager 110 determines which option is selected by the occupant.

When it is determined that the occupant has not selected the manual parking (step S103, NO), parking support apparatus 100 executes the automatic parking (step S104), and terminates this control after the completion of step S104.

On the other hand, when the occupant has selected the manual parking (step S103, YES), state manager 110 determines whether manual parking will be performed anew (step S105). More specifically, display image generator 170 outputs a display and a question message for the occupant to select whether to perform manual parking anew. State manager 110 determines the resulting selection operation by the occupant. When the occupant has selected performing manual parking anew, state manager 110 determines that storing the safety region based on the present manual parking anew by erasing the safety region stored in storage 120 is selected. On the other hand, when the occupant has selected not performing manual parking anew, it is determined that updating the safety region stored in storage 120 based on the present manual parking is selected. For example, the occupant can redo manual parking by selecting it anew in the case where the occupant thinks that the start point (learning point) of the last manual parking, or automatic parking based on the last manual parking is not favorable.

When it is determined that manual parking will not be performed anew (step S105, NO), the process is advanced to step S107. On the other hand, manual parking will be performed anew (step S105, YES), storage 120 stores in storage 120 the present position of vehicle 1 as a learning point (step S106). Note that when the above-described safety region and parking path are stored in storage 120, storage 120 may also perform a process of initializing the safety region and the parking path. It should be noted that when the process proceeds from step S102 to step S106 because the point does not coincide with the learning point (step S102, NO), another learning point is added and stored separately from the stored learning point, and therefore storage 120 secures another storage region without initializing the safety region and the parking path of the stored another point.

Next, step S107 is described. When the process is advanced to step S107, state manager 110 sets the internal state to the manual parking state. In the manual parking state, parking support apparatus 100 stores the manual parking (step S107). More specifically, safety region setter 140 specifies the range overlapping the vehicle body during the manual parking as the safety region, and storage 120 stores the safety region. In addition, when an operation of designating a parking position, such as a press down of a parking position button, is detected when vehicle 1 is in a stop state, state manager 110 causes storage 120 to record the parking position. In addition, after the parking position is recorded, state manager 110 asks the occupant whether to cancel the learning permission, and when no cancel of the learning permission is made (step S108, NO), manager 110 continues the manual parking (learning). More specifically, until it goes a remote place after passing through the learning point (step S109, NO), the manual parking state is continued. In this manner, safety region setter 140 adds, to the safety region, the range where vehicle 1 has passed at the time of exiting. That is, since the manual parking state is continued unless the learning permission is cancelled at the time of parking, no distinction is made between the parking drive and the exiting drive. In addition, in the case where the process is set such that the process remains at step S107 even after ON/OFF of the engine in this step, the exiting may be made immediately after the parking, or on another day. Alternatively, the process may be returned to step S107 when it is determined that there is a learning permission and that the present position and the learning point are substantially the same when the engine is turned ON.

When it is determined at step S108 that the learning permission is cancelled (step S108, YES), the process is advanced to step S110. On the other hand, when the learning permission is not cancelled (step S108, NO), and vehicle 1 has passed through the learning point (step S109, YES), the process is advanced to step S110. Regarding the determination of the passage of the learning point at step S109, it is possible to determine that vehicle 1 has passed through the learning point when vehicle 1 passes through the vicinity of the learning point and vehicle 1 moves in a direction opposite to the direction of the first movement from the learning point, for example.

When it is determined that vehicle 1 has not passed through the learning point (step S109, NO), the process is returned to step S107, and therefore the manual parking (learning) is continued as described above. On the other hand, vehicle 1 has passed through the learning point (step S109, YES), or the learning permission has been cancelled (step S108, YES), path generator 150 calculates the parking path (step S110). After the parking path is calculated, storage 120 stores the learning point, the safety region, the parking path and the learning permission. In addition, in the case where the learning permission is stored, the safety region based on the second and subsequent manual driving can be added to the safety region up to that point by automatically continuing the manual parking (step S105, NO) when returning to the learning point and proceeding to the determination at step S105. In addition, although not illustrated in the drawings, it is possible to adopt a process in which when there is no record of the parking position at execution of the process of step S110, display image generator 170 provides a notification that there is no record of the parking position, path generator 150 does not calculate the parking path, storage 120 does not record the safety region and the parking path, and the control is terminated by skipping the process of providing a notification (step S111).

When the parking path has been calculated, display image generator 170 displays the start position of automatic parking and performs a process of providing a notification of completion of the manual driving (step S111). Thereafter, this control is terminated. Note that when the vehicle is driving at the completion of the parking path calculation, this control may be terminated by skipping the process of providing a notification (step S111).

Figure 18:
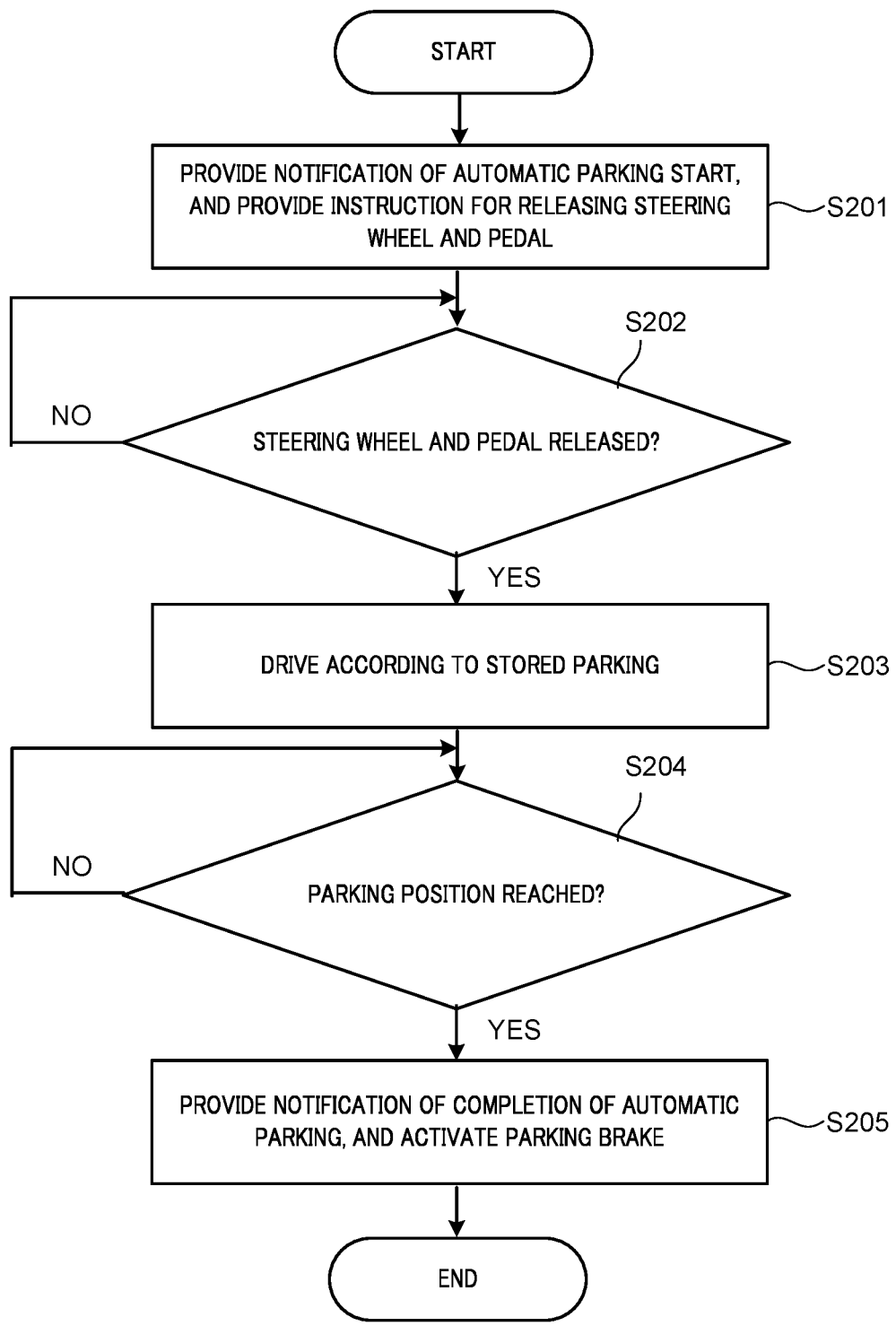
FIG. 18 is a flowchart illustrating an exemplary operation of an automatic parking control in the parking support apparatus.

Further, an exemplary operation of an automatic parking control (the process of step S104) by parking support apparatus 100 is described below. FIG. 18 is a flowchart illustrating an exemplary operation of automatic parking control at parking support apparatus 100.

As illustrated in FIG. 18, display image generator 170 provides a notification of the start of automatic parking, and provides an instruction for releasing the steering wheel and the pedal (step S201). Then, state manager 110 determines whether the steering wheel and the pedal have been released (step S202).

When it is determined that at least one of the steering wheel and the pedal has not been released (step S202, NO), the process of step S202 is repeated. On the other hand, when both the steering wheel and the pedal have been released (step S202, YES), drive controller 160 causes vehicle 1 to drive in accordance with the stored parking path (step S203). Alternatively, it is possible to adopt a process in which ground object detector 130 specifies the positional relationship of the present position of vehicle 1 and the start point of the parking path, path generator 150 sets a transition path from the present position of vehicle 1 to the start point of the parking path, and drive controller 160 causes vehicle 1 to drive along the transition path and the parking path.

During the driving, state manager 110 determines whether vehicle 1 has reached the parking position (step S204). When it is determined that vehicle 1 has not reached the parking position (step S204, NO), the process of step S204 is repeated and driving is continued. On the other hand, when vehicle 1 has reached the parking position (step S204, YES), display image generator 170 provides a notification of completion of the automatic parking, and drive controller 160 activates the parking brake (step S205). At this time, drive controller 160 may set the gear to the parking. After step S205, this control is terminated.

According to the present embodiment having the above-mentioned configuration, a parking path for driving within the range of the performance of the electric power steering and for passing inside the safety region is generated, and thus it is possible to suppress deviation of vehicle 1 from the safety region during automatic driving due to the performance of the electric power steering. That is, according to the present embodiment, learning type automatic parking can be achieved even with an electric power steering with a weak torque.

In addition, when path generator 150 attempts to set the parking path with the same number of strokes as in the manual parking and the attempt fails, a parking path with increased the number of strokes is generated as illustrated in FIGS. 15 and 16, for example. As a result, vehicle 1 can reliably park in a parking position through automatic parking without deviation from the safety region.

In addition, safety region setter 140 adds to the safety region the range estimated to be the range where the vehicle body passes at the time of exiting of vehicle 1, the range estimated to be the range where the vehicle can pass, or the range where the vehicle body has passed at the time of exiting of vehicle 1, and thus the exiting path, i.e., the region that can be determined to be the region with no hindrance, can be set as the safety region. As a result, the safety region can be expanded, and thus the path of automatic parking can be more freely set.

In addition, since safety region setter 140 performs the process of excluding from the safety region the range where the hindrance is detected during the manual parking, collision of vehicle 1 with the hindrance during automatic parking can be reliably avoided.

In addition, safety region setter 140 applies the exclusion process of excluding from the safety region the range where the hindrance is detected during the manual parking for the range estimated to be the range where the vehicle body passes at the time of exiting of vehicle 1 or the range estimated to be a range where vehicle 1 can pass (the range where there is no record of passage of vehicle 1), whereas safety region setter 140 does not apply the excluding process for the range where the vehicle body has passed during the manual parking or the range where vehicle 1 has passed at the time of exiting (the range with a record of passage of vehicle 1). That is, the excluding process is applied only to required cases, and thus the excessive reduction of the safety region can be suppressed.

In addition, since safety region setter 140 sets the range where the vehicle body has passed in the manual parking of multiple times as the safety region, the safety region can be increased, and in turn, the path of automatic parking can be more freely set.

In addition, safety region setter 140 adds the range where the vehicle body of vehicle 1 has passed to the safety region during the manual driving or the automatic driving. Therefore, for example, the range deviated from the safety region due to slip and the like during automatic driving can be added to the safety region, and thus path generator 150 can more easily generate a more moderate parking path (automatic parking path) inside the updated the safety region. In addition, when a learning permission for permitting the update of the safety region is made, safety region setter 140 performs addition of the safety region, and path generator 150 attempts to set the parking path with the same number of strokes as in the manual parking. Path generator 150 maintains the learning permission when it fails to set the parking path with the same number of strokes as in the manual parking, whereas path generator 150 cancels the learning permission when it succeeds in setting the parking path with the same number of strokes as in the manual parking. That is, the automatic parking with the same number of strokes as in the manual parking can be achieved by increasing the safety region until automatic parking can be achieved with the same number of strokes as in the manual parking.

The above-mentioned embodiments are merely examples of embodiments for implementing the present disclosure, and the technical scope of the present disclosure should not be interpreted as being limited by them. In other words, the present disclosure can be implemented in various forms without deviating from its gist or main features.

While various embodiments have been described herein above, it is to be appreciated that various changes in form and detail may be made without departing from the spirit and scope of the invention (s) presently or hereafter claimed.

This application is entitled to and claims the benefit of Japanese Patent Application No. 2022-175347, filed on Nov. 1, 2022, the disclosure of which including the specification, drawings and abstract is incorporated herein by reference in its entirety.

INDUSTRIAL APPLICABILITY

The parking support apparatus of the present disclosure is useful for a parking support apparatus and a parking support method that can achieve learning type automatic parking even with an electric power steering with a small torque.

REFERENCE SIGNS LIST

1 Vehicle
2 Camera
10 Operation apparatus
20 HMI apparatus
30 Vehicle control apparatus
40 Navigation apparatus
100 Parking support apparatus
110 State manager
120 Storage
130 Ground object detector
140 Safety region setter
150 Path generator
160 Drive controller
170 Display image generator

The invention claimed is:

1. A parking support apparatus comprising:
a storage configured to store as a manual parking path a path of manual parking in which a driver manually performs parking of a vehicle; and
a processor configured to set a safety region where the vehicle is allowed to pass based on the manual parking path stored in the storage,
wherein the processor generates an automatic parking path based on the safety region set and a performance of an electric power steering,
wherein the processor causes the vehicle to perform automatic driving based on the automatic parking path, and
wherein the processor generates a parking path configured for driving within a range of the performance of the electric power steering and for the vehicle to pass inside the safety region,
wherein the storage stores the safety region,
wherein the processor adds to the safety region a range where a vehicle body of the vehicle has passed during manual driving or automatic driving of the vehicle,
wherein the processor generates the automatic parking path when the safety region is updated,
wherein when a learning permission of permitting addition of the safety region is made, the processor performs addition of the safety region, and
wherein when the processor makes an attempt to set a parking path with the same number of strokes as in the manual parking and fails to set the parking path with the same number of strokes as in the manual parking, the processor maintains the learning permission, whereas when the processor succeeds in setting the parking path with the same number of strokes as in the manual parking, the processor cancels the learning permission.

2. The parking support apparatus according to claim 1, wherein the processor makes an attempt to set a parking path configured for driving within a range of the performance of the electric power steering and for the vehicle to pass inside the safety region with the same number of strokes as in the manual parking, and
wherein when the attempt of setting the parking path fails, the processor generates a parking path with an increased number of strokes.

3. The parking support apparatus according to claim 1, wherein the processor sets a range where a vehicle body has passed during the manual parking to the safety region, and
wherein the processor includes, in the safety region, a range estimated to be a range where the vehicle body passes at a time of exiting of the vehicle based on the manual parking path, a range estimated to be a range where the vehicle is allowed to pass based on the manual parking path, or a range where the vehicle body has passed at the time of exiting of the vehicle.

4. The parking support apparatus according to claim 3, wherein the processor performs an excluding process of excluding a range where a hindrance is detected during the manual parking from the safety region.

5. The parking support apparatus according to claim 4, wherein the processor applies the excluding process to the range estimated to be the range where the vehicle body passes at the time of exiting of the vehicle based on the manual parking path, or the range estimated to be the range where the vehicle is allowed to pass based on the manual parking path, and
wherein the processor does not apply the excluding process to a range where the vehicle body has passed during the manual parking, or the range where the vehicle body has passed at the time of exiting of the vehicle.

6. The parking support apparatus according to claim 1, wherein the processor sets the safety region based on paths of manual parking of multiple times, and
wherein the processor sets a range where a vehicle body has passed during the manual parking of multiple times to the safety region.

7. A parking support method comprising:
storing, in a storage, as a manual parking path a path of manual parking in which a driver manually performs parking of a vehicle;
setting, by a processor, a safety region where the vehicle is allowed to pass based on the manual parking path stored in the storage;
generating, by the processor, an automatic parking path based on the safety region set and a performance of an electric power steering;
causing, by the processor, the vehicle to perform automatic driving based on the automatic parking path; and
in the generating the automatic parking path, generating a parking path configured for driving within a range of the performance of the electric power steering and for the vehicle to pass inside the safety region,
wherein the storage stores the safety region,
wherein the processor adds to the safety region a range where a vehicle body of the vehicle has passed during manual driving or automatic driving of the vehicle, and wherein the processor generates the automatic parking path when the safety region is updated, wherein when a learning permission of permitting addition of the safety region is made, the processor performs addition of the safety region, and wherein when the processor makes an attempt to set a parking path with the same number of strokes as in the manual parking and fails to set the parking path with the same number of strokes as in the manual parking, the processor maintains the learning permission, whereas when the processor succeeds in setting the parking path with the same number of strokes as in the manual parking, the processor cancels the learning permission.

* * * * *